US006983481B2

(12) United States Patent \
Fellenstein et al.

(10) Patent No.: US 6,983,481 B2 \
(45) Date of Patent: Jan. 3, 2006

(54) APPARATUS AND METHOD FOR BLOCKING TELEVISION COMMERCIALS WITH A CONTENT INTERROGATION PROGRAM

(75) Inventors: Craig William Fellenstein, Brookfield, CT (US); Rick Allen Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 10/205,538

(22) Filed: Jul. 25, 2002

(65) Prior Publication Data

US 2004/0019904 A1      Jan. 29, 2004

(51) Int. Cl. \
*H04N 7/16* (2006.01)

(52) U.S. Cl. ............................ 725/25; 725/19; 725/27; 725/29

(58) Field of Classification Search ............ 725/25–61, 725/151; 386/119, 124 \
See application file for complete search history.

(56) References Cited

U.S. PATENT DOCUMENTS

| 5,754,939 | A | * | 5/1998 | Herz et al. .................. 455/3.04 |
| 5,859,662 | A | * | 1/1999 | Cragun et al. ............... 725/137 |
| 5,949,476 | A | | 9/1999 | Pocock et al. ................ 348/24 |
| 5,973,723 | A | * | 10/1999 | DeLuca ........................ 725/34 |
| 6,144,376 | A | | 11/2000 | Connelly ..................... 345/327 |
| 6,370,543 | B2 | * | 4/2002 | Hoffert et al. ........... 707/104.1 |
| 6,581,207 | B1 | * | 6/2003 | Sumita et al. ................ 725/46 |
| 6,597,405 | B1 | * | 7/2003 | Iggulden ..................... 348/553 |

* cited by examiner

*Primary Examiner*—Kieu-Oanh Bui \
(74) *Attorney, Agent, or Firm*—David A. Mims, Jr.; Rudolf D. Siegesmund

(57) ABSTRACT

An apparatus and method is disclosed for blocking specific television commercials from the viewer's television based upon the characteristics of the television commercial and replacing the commercial with television content located by a content interrogation program. The content interrogation program seeks out television content based upon a user search term specifically for use as contingent programming to replace the blocked commercial. The content interrogation program can have multiple search terms and provide prioritized multiple searches to identify multiple segments to play in spaces created by blocked commercials.

37 Claims, 7 Drawing Sheets

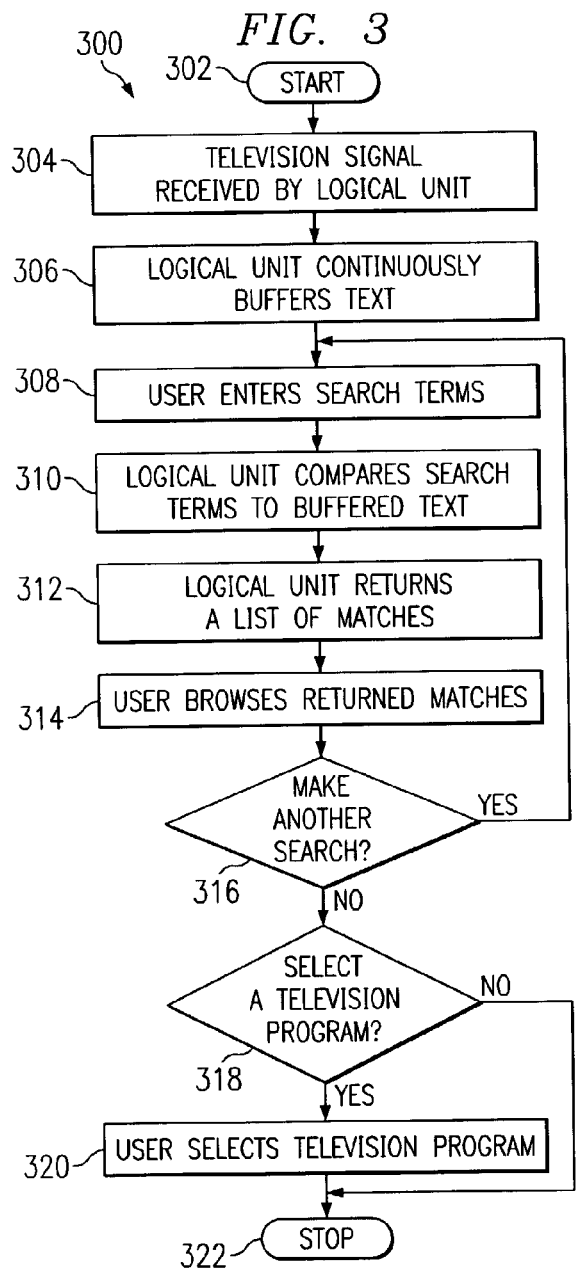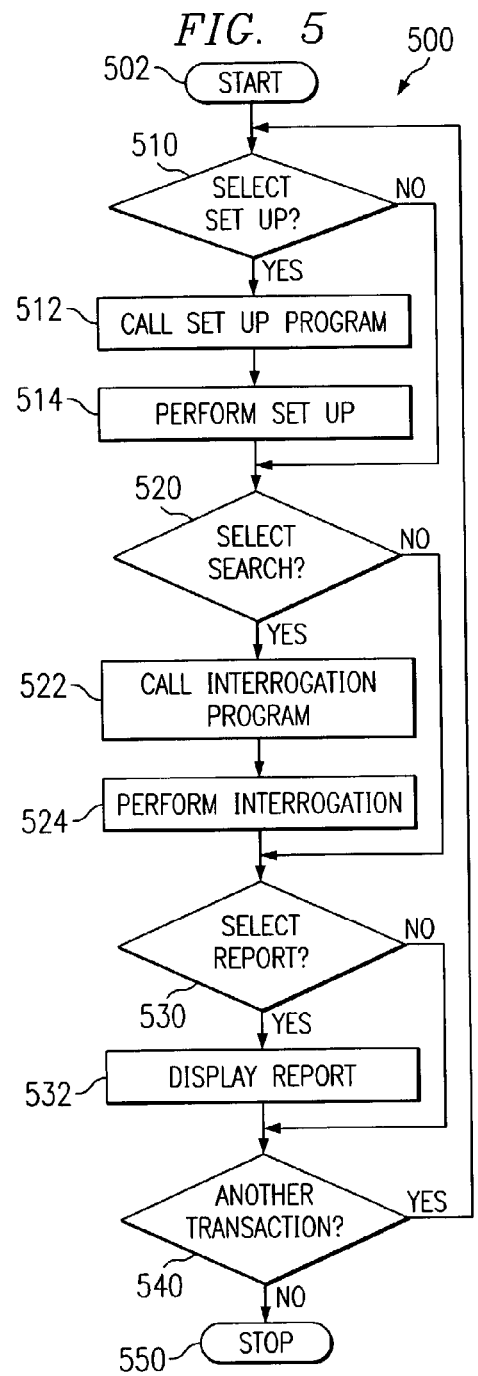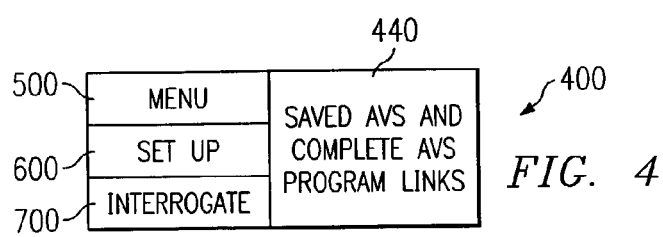

APPARATUS AND METHOD FOR BLOCKING TELEVISION COMMERCIALS WITH A CONTENT INTERROGATION PROGRAM

RELATED APPLICATIONS

This application is related to application Ser. No. 10/105,124, "Apparatus and Method of Searching for Desired Television Content," application Ser. No. 10/116,613, "Apparatus and Method for Blocking Television Commercials and Displaying Alternative Programming," and to Application docket number AUS920020258US1, "Apparatus and Method for Blocking Television Commercials and Displaying Micro-Programming Content."

FIELD OF THE INVENTION

The present invention relates to an apparatus and method for blocking undesired television commercials and interrogating the content of the programming in order to select alternate viewing to take the place of the blocked programming.

BACKGROUND OF THE INVENTION

Debates today rage about both the delivery and funding of informational content in all of its forms, On the Internet, many content providers are moving away from their advertisement-based business models and moving towards subscription-based business models. Despite rapid advances in technology, the delivery mechanisms and methods of generating revenue for content delivered through television broadcasts have been relatively stagnant, when compared to the delivery mechanisms and methods of generating revenue for the Internet and web delivery systems. In television broadcasts, advertisers still attempt to reach users using the same techniques that they have used for decades which are the thirty and sixty second commercials interspaced throughout specific television programs. In addition to technology, the viewer is becoming increasingly sophisticated and is demanding that every second of their time, whether engaged in work or leisure pursuits, be well spent. For the vast majority of television viewers, time engaged in viewing undesired advertisements is not considered time well spent. Therefore, a need exists for an apparatus and method for preventing a television viewer from viewing unwanted commercials.

application Ser. No. 10/116,613, "Apparatus and Method for Blocking Television Commercials and Displaying Alternative Programming," discloses a logical unit and a commercial blocking program in the logical unit to allow alternative viewing options so that the user may define the alternative programming to replace the unwanted commercial. The commercial blocking program breaks all incoming television signals into time, video, and audio components and is able to recognize specific commercials based on those components. Upon viewing an unwanted commercial, the user indicates that he wants to block the commercial through one of a variety of input methods. The commercial blocking program then prevents the commercial from being displayed on the user's television and causes alternative programming to be displayed instead. The user may configure the alternative programming via the alternative programming logic. The user may configure the alternative programming as a universal television channel, based on the specific commercial, based on the television station, based on the time of day, or based on an elaborate viewing hierarchy. At the end of the blocked commercial, the commercial blocking program displays the television program that was originally displayed on the user's television. Alternatively, the commercial blocking program can buffer the various television programs received from the cable provider and record segments of the cable signal based on certain keywords. The commercial blocking program searches for user defined keywords, records television programs complying with the search terms, and displays the recorded television programming stored in the memory.

application Ser. No. 10/105,124, "Apparatus and Method of Searching for Desired Television Content," discloses an apparatus and method for allowing a user to search for specific content across many television channels in order to locate desirable television shows related to the searched content. Multiplexed cable signals flow through a logical unit which buffers text associated with the voice stream of each station via the pre-encoded closed-captioning signal or through the real-time voice translation within the logical unit. The user then enters search terms through one of a variety of different input devices. Upon entry of the search terms, the logical unit will compare the entered term with those available keywords stored in each buffer. Lexical parsing associates terms which may differ from plural to singular forms or in tense. Additionally, synonym comparisons may be made. The logical unit will return a list of matches for the search criteria and allows the user the option of going directly to the television program. The logical unit also evaluates each returned item for its relevancy to the keywords. When not in use, the logical unit maintains a quiescent but monitoring state permitting continuous creation of lexical buffers. This permits the user who turns on the television to immediately have such search terms available. Alternatively, the logic is implemented at the cable provider and enabled through interactive links to the home. In that case, the home logical unit is unnecessary.

SUMMARY OF THE INVENTION

The present invention, which meets the needs stated above, is an apparatus and method for blocking specific television commercials from the viewer's television based upon the characteristics of the television commercial and replacing the commercial with television content located by a content interrogation program. The content interrogation program seeks out television content based upon a user search term specifically for use as contingent programming to replace the blocked commercial. The content interrogation program can have multiple search terms and provide prioritized multiple searches to identify multiple segments to play in spaces created by blocked commercials.

BRIEF DESCRIPTION OF THE DRAWINGS

FIG. 3 is a flowchart of the search program.

FIG. 4 is a block chart of the content interrogation program.

FIG. 5 is a flowchart of the menu program of the content interrogation program.

DETAILED DESCRIPTION OF THE PREFERRED EMBODIMENT

Figure 1:
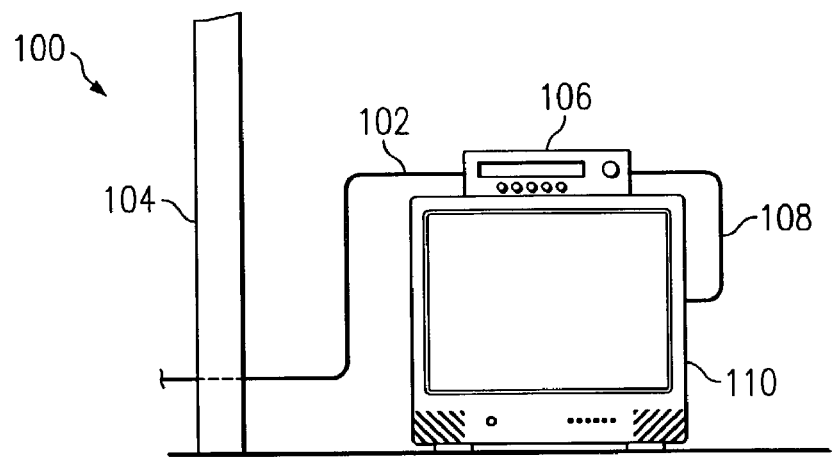
FIG. 1 is an illustration of the invention interacting with a cable provider and a television.

The terms below are defined for all uses herein as follows:

"Alternate viewing" means content displayed in place of a blocked commercial and may include one or more of the following: (1) a brief message displayed to inform the viewer that alternative programming will be presented during the commercial interval; (2) an on-screen counter, showing how many seconds are left before the planned return to primary viewing; and (3) directions to the tuner to go to a particular station. The directions to the tuner may be universal, by commercial, by originating station, by time of day, by definition of an elaborate viewing hierarchy, or to a micro-programming station or to buffered microprogramming.

"Alternate viewing provider" means an entity that offers micro-programming to a user for display in conjunction with a logical unit.

"Buffered package" means an alternate viewing package stored in the memory of a logical unit or at the cable service provider so that synchronization problems between the "switchover" point and the alternate programming delivery do not occur. In other words, when a request for alternative programming is made, the logical unit can draw from a buffered alternate viewing package so that the user does not risk joining the alternate viewing package in progress.

"Buffering" means a process of examining the closed captioning text or audio signal associated with television signals and configuring the examined signal such that it may be searched for specific keywords.

"By commercial" means using content from a particular station to replace the specifically identified commercial.

"By originating station" means using the original station to determine the alternative content which will replace all blocked commercials.

"By time of day" means using the time of day to determine which station to use as alternative content for all blocked commercials.

"Cable provider" means a company which provides television service to multiple users and includes satellite television providers.

"Component signature" is a group of variables, based on a time component, an X video component, a Y video component, and an audio component, that are used to identify a commercial from all other commercials when a cumulative digital signature is not available.

"Cumulative digital signature" means the aggregation of one or more selected characteristics of a data sequence to provide a unique number for identification of the complete data sequence.

"Elaborate viewing hierarchy" means a combination of a plurality of universal, by commercial, by originating station, or by time of day alternative viewing formats.

"Lexical parsing" as used herein means a process of finding matches to a desired search term by comparing the desired search term letter-by-letter with the terms in an available database.

"Micro-programming," means one or more "alternate viewing packages" that each contain a complete information exchange or an entertainment package in a segment of time that is adapted to fit into the time available from one or more commercials blocked by a logical unit. For example, an alternate viewing package could contain news headlines, weather updates, sports updates, or very short live action or animated shorts that are designed to entertain the user in a crisp, concise segment. An alternate viewing package would normally be thirty or sixty seconds in length but could be designed for any length of time that a logical unit could make available.

"Multiplex" means the process of funneling several different streams of data over a common communications line.

"Staggered time alternate viewing package" means an alternate viewing package broadcast on start times that are staggered for a number of seconds to coincide with the time slots of blocked commercials. For example, an alternate viewing package may start at the top and bottom of the minute on a given station, and at 15 and 45 seconds on another station. Accordingly, the station with the alternate viewing package start time closest to the start time of the blocked commercial would be chosen.

"T" means a numerical value corresponding to playing time of a video segment containing a data that matches a search criterion.

"T before" means defining a video segment as the portion of a video segment containing a data that matches a search criteria plus a portion of the video segment before the data that runs for time equal to T.

"T after" means defining a video segment as the portion of a video segment containing a data that matches a search criteria plus a portion of the video segment after the data that runs for time equal to T.

"T center" means defining a video segment as the portion of a video segment containing a data that matches a search criteria plus a portion of the video segment before the data that runs for time equal to ½ T and a portion of the video segment after the data that runs for a time equal to ½ T.

"Time synchronized" means an alternate viewing package, delivered on demand in which the user joins the broadcast at the exact start point of the micro-program.

"Unique digital identifying tag" means a number sequence before the header and after the trailer of each commercial. The number sequence is assigned according to an industry standard that allows each commercial to be identified from every other commercial.

"Universal" means using content from a particular station to replace all blocked commercials.

FIG. 1 is an illustration of the invention 100 interacting with a cable provider and a television set. The depiction of the cable provider is by way of illustration only and is not intended to limit the scope of the invention. Persons skilled in the art will recognize that the invention may be used with either a cable or wireless data transmission system. The cable provider (not shown) provides a television signal through a coaxial cable 102 that runs through the user's wall 104 and into logical unit 106. Logical unit 106 analyzes the cable signal as described below and displays the information on television 110 via television connection 108. Logical unit 106 can optionally be combined with television 110. Alternatively, logical unit 106 may be placed at the same location as the cable provider such that it is unnecessary to have logical unit 106 at the user's location.

Figure 2A:
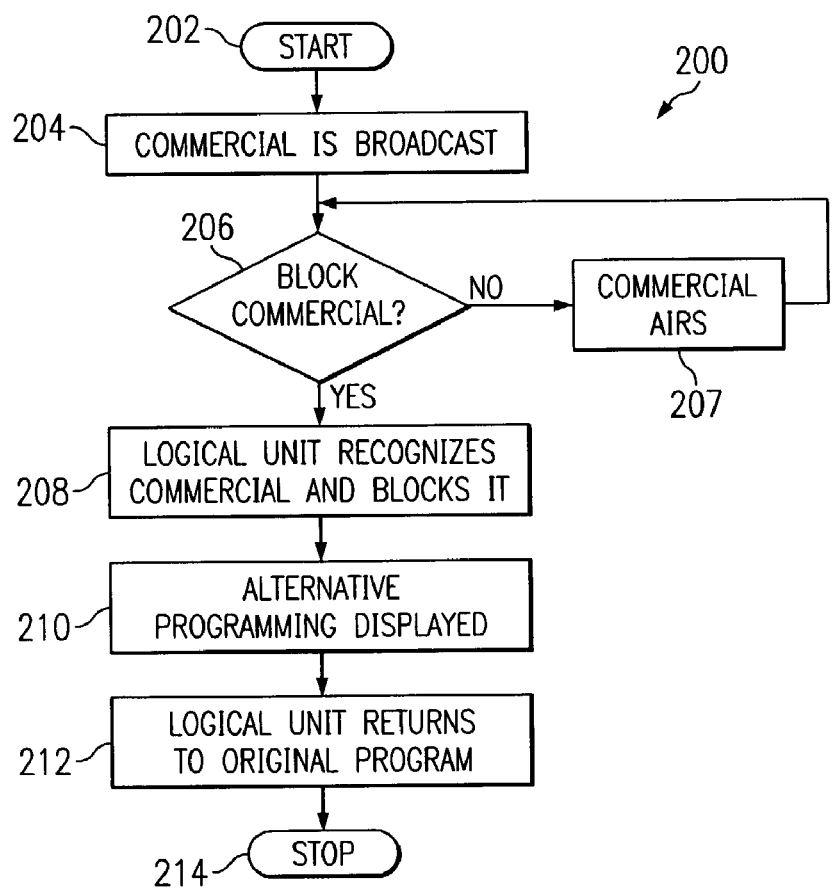
FIG. 2A is a flowchart of the commercial blocking program.

FIG. 2A is a flowchart of commercial blocking program 200 which operates inside logical unit 106. Commercial blocking program 200 starts (202) whenever multiplexed cable signals are broadcast (204). In the preferred embodiment, each commercial has a unique digital identifying tag, similar to a serial number, which identifies a particular commercial. Logical unit 106 recognizes a particular commercial based on the unique identifying tag.

In an alternate embodiment, logical unit 106 identifies commercials by a "component signature." Multiplexed cable signals are defined by four components: a time component, an X video component, a Y video component, and an audio component. Every television program and/or commercial can be readily identified by these components. There is generally allowed some amount of time skew in the synchronization of the four components to identify the absolute beginning of a program or commercial. By taking the time skew into consideration, commercial blocking program 200 can identify a particular commercial. For example, a given pattern of video/audio signals occurring at a time "delta" (perhaps but not necessarily in the order of 500 microseconds) around the nominal beginning of an advertisement, may point back to a specified commercial.

Alternatively, logical unit 106 establishes a "cumulative digital signature" for a particular commercial. In this event, the signal need not be dissembled into its video/audio components as in the "component signature," but rather, analysis of cumulative digital characteristics may be used to identify the commercial to be blocked. One or more characteristics of a data sequence is selected and aggregated to provide a unique number for identification purposes of the complete data sequence. The advantage of using cumulative digital characteristics is that all commercials could be blocked using this technique. In the case of commercials to be identified by a "cumulative digital signature," the logical unit develops a library of the "cumulative digital signature" of the blocked advertisements. For example, it may be assumed that some time interval, "$T_{sample}$" is great enough to ascertain with accuracies approaching one hundred percent the identity of a given advertisement. "$T_{sample}$" may be a sub-second or it may be multi-second, depending on the processing power behind the logical unit and the uniqueness of the commercial. Once a commercial signal is detected to be identical to a blocked advertisement, then the logical unit takes the actions it has been programmed to implement.

As a commercial airs, the user has the option of blocking the commercial (206) by means of commercial blocking program 200 located in the local memory 809 (See FIG. 8) of logical unit 106 (See FIG. 1). If the user chooses not to block the commercial, then commercial blocking program 200 allows the commercial to air (207) and returns to step 206. If at step 206 the user chooses to block the commercial, then the logical unit will block the commercial (208). In blocking the commercial, the logical unit prevents the specific commercial from displaying on the user's television and displays alternative content instead (210). After commercial blocking program 200 has displayed the alternative programming, the original programming of the original television channel is displayed (212) and commercial blocking program 200 ends (214).

Figure 2B:
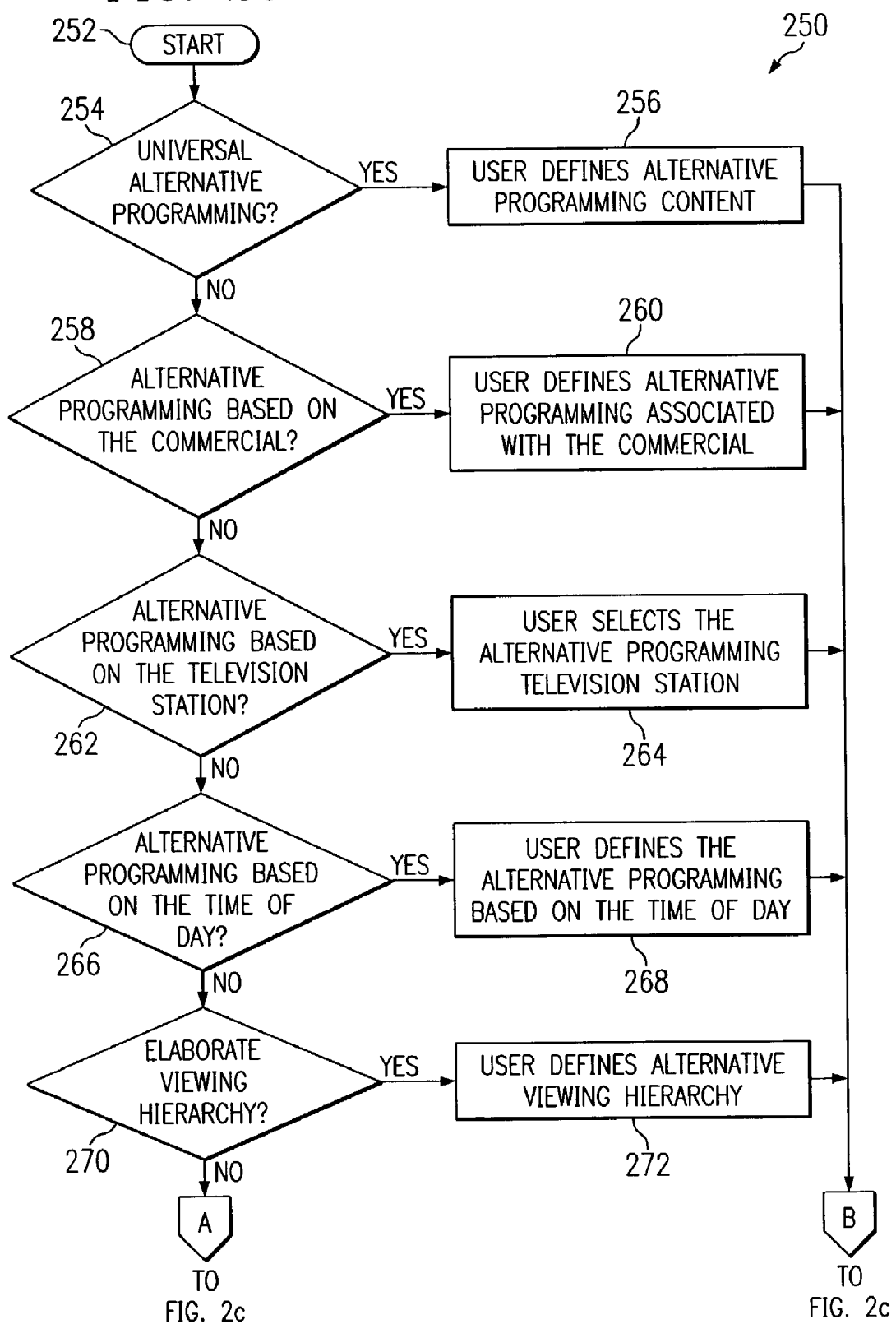
FIG. 2B is a flowchart of the alternative programming logic.
Figure 2C:
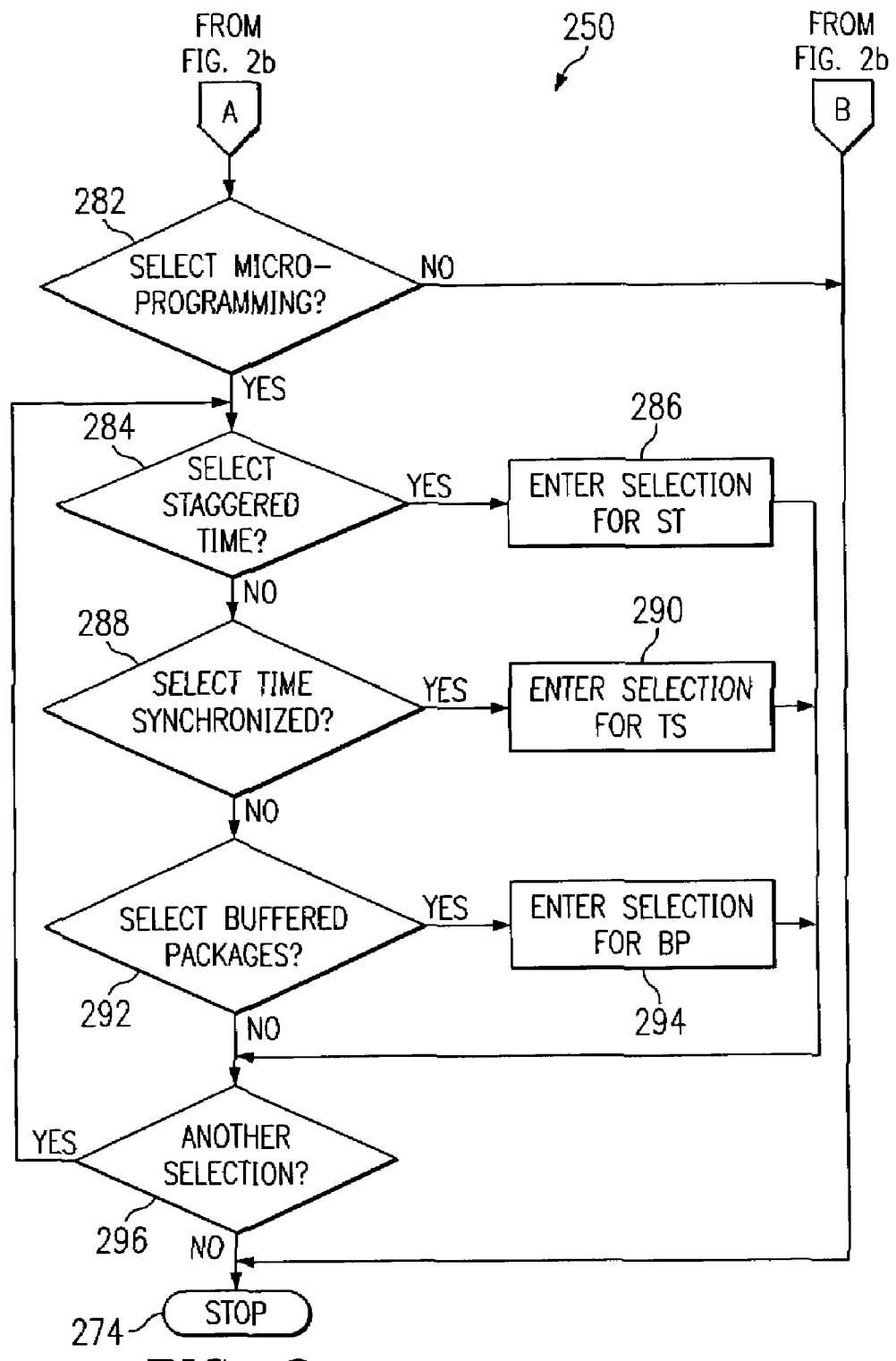
FIG. 2C is a flowchart of the alternative programming logic.

There are many different types of alternative programming that commercial blocking program 200 can display on the user's television instead of the blocked commercial. In one embodiment, commercial blocking program 200 can display a blank screen for the duration of the blocked commercial. However, in the preferred embodiment, commercial blocking program 200 displays the programming according to alternative programming logic 250 in FIGS. 2B and 2C. Alternative programming logic 250 starts (252) and queries the user if he or she would like to define the alternative programming as a universal television channel that will replace all blocked television commercials (254). A universal television channel is one which will display the contents of a specific television channel on the user's television whenever the blocked commercial airs. For example, whenever a blocked commercial airs, commercial blocking program 200 will cause THE WEATHER CHANNEL® to be displayed. A universal television channel may include WEB TV® or any programming variation that may be made available to the user of the television to which the logical unit is connected. If the user determines that they would like to select a universal alternative channel, then the user specifies which channel is the universal television channel (256) and alternative programming logic 250 ends (274). If at step 254 the user determines that he or she would not like to select a universal television channel, then alternative programming logic 250 queries the user if he or she would like to define the alternative programming based on the blocked commercial (258). Alternative programming based on the blocked commercial will display a particular television channel whenever a specific blocked commercial airs. For example, whenever commercial X airs, commercial blocking program 200 will cause THE WEATHER CHANNEL® to be displayed. If the user determines that he or she would like to define the alternative programming based on the blocked commercial, then the user selects a specific television channel that will display whenever the specific television commercial airs (260) and alternative programming logic 250 ends (274). If the user determines at step 258 that he or she does not want to define the alternative programming based on the commercial, alternative programming logic 250 queries the user whether he or she would like to define alternative programming based on the television channel (262). Alternative programming based on the television channel will display television content based on a preferred television channel and a contingent television channel when the blocked commercial airs. For example, whenever a blocked commercial airs, THE WEATHER CHANNEL® will be displayed, and in the event THE WEATHER CHANNEL® is already being displayed, then CNN® will be displayed. If the user determines that he or she would like to define the alternative programming based on the television channel, then the user defines the preferred and contingent television channels (264) and alternative programming logic 250 ends (274). A contingent television channel may be selected by a Content Interrogation Program (CIP) (see FIG. 4) that selects a particular television channel based upon selected search criteria. If at step 262 the user determines that he or she does not want to define alternative programming based on the television channel, then alternative programming logic 250 queries the user whether he or she would like to define alternative programming based on the time of day (266). Alternative programming based on the time of day displays a specific television channel depending on the time of the blocked commercial. For example, if the blocked commercial airs before noon, THE WEATHER CHANNEL® will be displayed, and if the blocked commercial airs after noon, CNN® will be displayed. If the user would like to define the alternative programming based on the time of day, then the user defines the alternative television channels and the time associated with each alternate channel (268), and alternative programming logic 250 ends (274). If at step 266 the user determines that he or she does not want to define the alternative programming based on the time of day, alternative programming logic 250 queries the user whether he or she would like to define alternative programming based on an elaborate viewing hierarchy (270).

An elaborate viewing hierarchy is a combination of the alternative programming determinations in steps 254, 258, 262, and 266. There are numerous possible combinations of the programming determinations that will create elaborate viewing hierarchies. For example, one possible elaborate viewing hierarchy would be "whenever a blocked commercial airs, display THE WEATHER CHANNEL®; however, if there is also a blocked commercial on THE WEATHER CHANNEL®, then go to CNN® before noon and CNBC® after noon." The elaborate viewing hierarchy may offer the user the option to "mix and match" various combinations of blocked and unblocked signals. For example, the user may select a split screen option where the blocked commercial appears in a portion of the screen while alternate programming appears in the remaining portion of the screen. The user may select an option that will display alternative programming while also displaying the close captioned text of the blocked commercial. Further in the alternative, the user may elect to have more than one alternate programming option displayed. For example, the user may elect to have a split screen display CNN® on one portion of the screen and THE WEATHER CHANNEL® on the other portion of the screen. If the user would like to define an elaborate viewing hierarchy, then the user enters the appropriate information (i.e. time, channel, and commercial) to define the hierarchy (272) and alternative programming logic 250 ends (274). If at step 270 the user determines that he or she would not like to define an alternative viewing hierarchy, alternative programming logic 250 goes to step 282 (See FIG. 2C).

Next a determination is made as to whether the user wants to select micro-programming (282). If the user does not want to select micro-programming, alternate programming logic 250 ends (274). If at step 282 the user determines that he or she wants to select microprogramming, a determination is made as to whether staggered time alternate viewing packages are desired (284). If staggered time alternate viewing packages are desired, then the selection is entered (286) and alternate programming logic 250 goes to step 296. If staggered time alternate viewing packages are not selected, then a determination is made as to whether the user wants to select time synchronized alternate viewing packages (288). If the user desires to select time synchronized alternate viewing packages, then the selection is entered (290) and alternate programming logic 250 goes to step 296. If the user does not select time synchronized alternate viewing packages, then a determination is made as to whether a buffered alternate viewing package is desired (292). If a buffered alternate viewing package is desired, then the selection is entered (294). If a buffered alternate viewing package is not desired, then a determination is made as to whether another selection is made (296). If another selection is to be made, alternate programming logic 250 goes to step 284. If another selection is not to be made, alternate programming logic 250 ends (274). A default option may also be available if the alternate viewing service provider plays continuously broadcast alternate viewing packages. In that case the default option would be that the television would move to the alternate viewing broadcast at the time of the blocked commercial and pick up the alternate viewing package playing at that time.

In an alternative embodiment of alternative programming logic 250, a negative determination at step 296 would send the user back to step 254 so that the options may be viewed again. Additionally, there are other types of alternative programming which may be displayed at step 210. The user can then enter search criteria and search program 300 (See FIG. 3) will record the television signal based on the specific time, channel, and/or keywords. For example, whenever "and now your local forecast" is found in the audio component of the cable signal for THE WEATHER CHANNEL®, logical unit 106 can record the accompanying local forecast. Additionally, logical unit 106 can be set to record a specific show. For example, logical unit 106 could be set to record the 11 a.m. SPORTS CENTER® on ESPN®. In either case, the recorded programming can be displayed in place of the blocked commercial.

FIG. 3 is a flowchart of the search program contained within logical unit 106 of the present invention. Search program 300 starts (302) and logical unit 106 receives the cable signal transmitted by the cable provider (304). The cable signal is multiplexed and comprises at least a visual signal, an audio signal, and a closed caption text signal. Moreover, the multiplexed cable signal is not limited to real-time cable programming. The multiplexed signal may also contain information regarding past and future television programs. As logical unit 106 receives the signal, search program 300 continuously buffers the transmitted multiplexed cable signal (306). In buffering the signal, search program 300 obtains the closed-caption text from the cable signal and stores the words contained in the captioning text along with the television channel number and time of the television program. Alternatively, search program 300 can buffer the television signal by analyzing the audio signal and buffering the keywords from the audio signal. The text buffering described above is known in the art. Furthermore, the buffering process is not limited to one television channel or one specific time period. If a user desires to buffer different channels at different times, then the user may do so by means of search program 300. For example, if search program 300 has ten hours of buffering time available, the user can have search program 300 buffer ten hours of a channel such as (CNN®). Alternatively, search program 300 can buffer four hours of CBS®, four hours of CNN®, and two hours of THE WEATHER CHANNEL®. Furthermore, the buffering times do not have to be similar. The user can define the CBS® buffering time from 5 am to 9 am, the CNN® buffering time from 8 am to noon, and THE WEATHER CHANNEL® from 1 pm to 3 pm. Additionally, search program 300 is not limited to the English language. Search program 300 is capable of buffering television in multiple languages simultaneously. Thus, at any given time search program 300 is capable of buffering an enormous variety of television programs.

The user then enters keyword terms that represent the search criteria for search program 300 (308). The search terms can be entered via a keyboard, stylus, infrared port, or on-screen programming. In entering the search terms, search program 300 will recognize conventional Boolean search terms such as "AND", "OR", and "NOT". Search program 300 is capable of accepting wildcard search terms. For example, the wildcard search term "run*" would search for run and all possible variations such as runner, running, runners, and so on. Search program 300 also compares each of the search terms to a dictionary database. If any of the search terms are not in the dictionary database, search program 300 will determine related words using lexical parsing and query the user if the terms are relevant to the desired search. Lexical parsing solves the problem of tense variation in the search terms. Search program 300 is also capable of resolving ambiguities in entered search terms by comparing the search terms to the dictionary database.

Those skilled in the art are aware of how to configure a search program to resolve ambiguities. In alternative embodiments, the query step can be removed where search program 300 automatically adds the lexically parsed words to the list of search terms. Additionally, the search criteria can comprise a date restriction (i.e. only today's programs, only programs on this week, or only programs on Tuesdays). Furthermore, the search criteria can comprise restrictions based on specific channels (i.e. only programs on ESPN®, DISCOVERY®, CNN®, or VH1®, or alternatively, only programs on channels 8, 12, 25, 45, or 54).

Search program 300 then compares the search terms to the buffered text (310). Search program 300 will compare the search terms to the terms contained within the buffer. In comparing the search terms with the buffered programs, search program 300 will also create a list of synonym search terms. By accessing a thesaurus database, search program 300 can obtain relevant synonyms and use those terms to search the buffered text as well. When the search term matches a word in the buffered text, search program 300 will mark the program and continue to search through the rest of the buffered text. When the entire buffered text has been searched, search program 300 evaluates the relevancy of each flagged item. In evaluating the relevancy of each flagged item, search program 300 looks to the original search terms, the synonyms search terms, the lexically parsed search terms, and the date, time and channel specified by the user. Search program 300 then ranks the flagged items from most relevant to least relevant.

Search program 300 then displays the list of television programs which were previously marked in step 310 (312). Search program 300 will organize the results of the search according to how well they correspond to the entered search criteria. The results of the search are displayed with the time and television channel pertaining to the television program. The user then browses the television programs returned in step 312 (314) and makes a determination whether he or she would like to conduct another search (316). If the user does want to conduct another search, search program 300 returns to step 308. If the user does not want to conduct another search, the user makes a determination whether he or she would like to select a television program (318). If the user decides to select a television program, the user selects a television program, search program 300 displays the selected television program (320), and search program 300 ends (322). If the user does not want to select a television program, then search program 300 ends (322).

FIG. 4 depicts a block diagram of Content Interrogation Program 400 which has menu program 500, set up program 600, interrogation program 700 and saved alternate viewing segments and complete alternate viewing segment programs links 440.

FIG. 5 depicts menu program 500. Menu program 500 starts (502) and a determination is made as to whether the user wants to select set up (510). If the user wants to select set up, the set up program 600 is called (512) and the user performs set up in accordance with set up program 600 (514). Menu program 500 then goes to step 520. If the user does not desire to set up then menu program 500 goes to step 520. A determination is made as to whether the user wants to perform a search (520). If the user wants to perform a search, interrogation program 700 is called (522) and the user performs an interrogation in accordance with interrogation program 700(524). Menu program 500 then goes to step 530 and a determination is made as to whether the user wants to have a report (530). If the user selects report, a report is displayed (532). A determination is made as to whether there is another transaction to be performed (540). If there is another transaction, menu program 500 goes to step 510. If there is not another transaction, menu program 500 stops (550).

Figure 6:
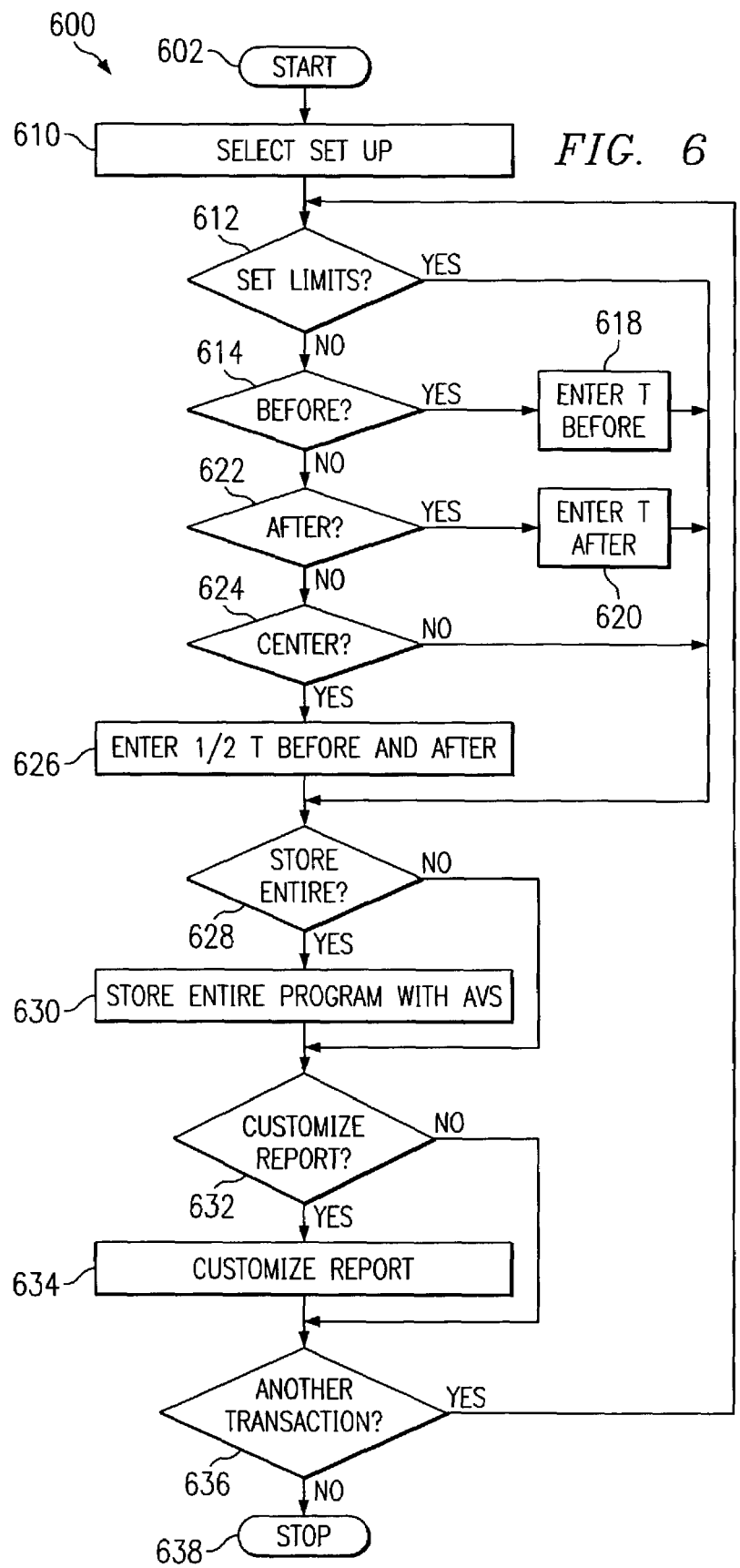
FIG. 6 is a flowchart of the set program of the content interrogation program.

FIG. 6 depicts a flow chart of set up program 600. Set up program 600 starts (602) and the user selects "set up" (610). A determination is made as to whether the user wants to set limits (612). If the user wants to set limits, a determination is made as to whether the user wants to set T "before" (614). If the user wants to set T "before," the user enters a value for T based upon the length of the alternate viewing segment desired to fill the blocked commercial (618). If the user does not want to set T "before" a determination is made as to whether the user wants to enter T "after" (622). If the user wants to enter T "after," the user enters a value for T based upon the length of the alternate viewing segment desired to fill the blocked material (620). If the user does not want to set T "after", a determination is made as to whether the user wants to enter T "center" (624). If the user wants to enter T "center," the user enters a value of ½ T "before" and "after" (626). Set up program 600 then goes to step 628. A determination is made as to whether the user wants to store the entire program of the alternate viewing segment (628). If the user wants to store the entire program of the alternate viewing segment, the user enters a selection for storing the entire program of the alternate viewing segment (630). Next, a determination is made as to whether the user wants to customize the report (632). If so, the user will enter the items he or she wants in the customized report (634). A determination is made as to whether or not the user wants to perform another transaction (636). If the user wants to perform another transaction, set up program 600 goes to step 612. If not, set up program 600 ends (638).

Figure 7:
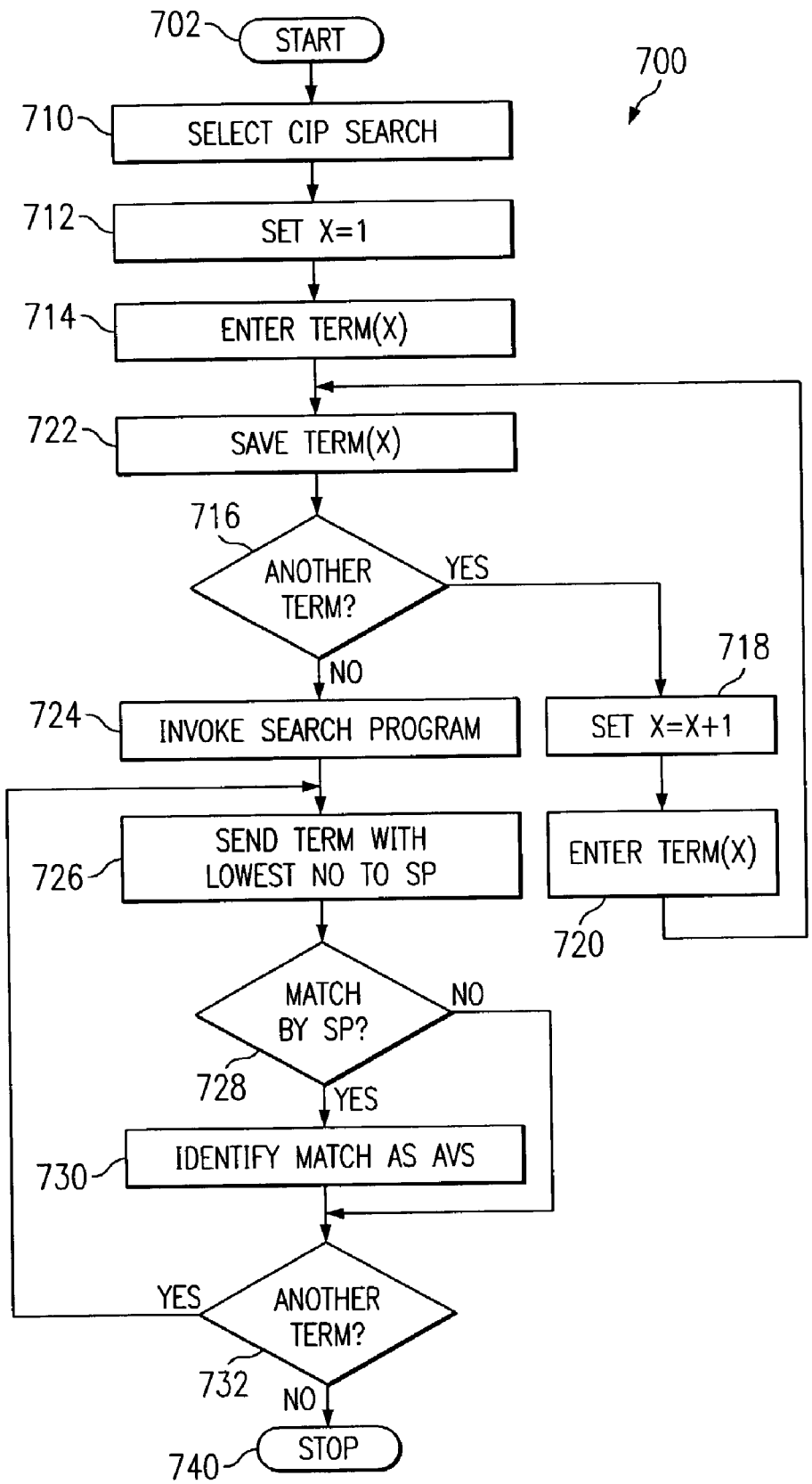
FIG. 7 is flowchart of the interrogation program of the content interrogation program.

FIG. 7 is a depiction of the flowchart for interrogation program 700. Interrogation program 700 begins (702) and the user selects the interrogation program option on logical unit 106 (710). Interrogation program 700 sets x=1 (712). The user enters a search term designated term (x) (714). Term (x) is saved (722) and interrogation program 700 goes to step 716. A determination is made as to whether the user wants to enter another term (716). If the user wants to enter another term, interrogation program 700 sets x=x+1 (718) and the user enters term (x) (720). Term (x) is saved (722) and interrogation program 700 returns to step 716. If at step 716, the user does not want to enter another term, interrogation program 700 invokes search program 300 (724). Interrogation program 700 sends the term with the lowest number to search program 300 (726). A determination is made as to whether or not search program 300 matched the term with content (728). If a match was made, the matched segment is identified as an alternate viewing segment (730) and interrogation program 700 goes to step 732. If a match was not made, then interrogation program 700 goes to step 732 and a determination is made as to whether there is another term to be matched (732). If there is another term to be matched, interrogation program 700 goes to step 726. If there is not another term to be matched, interrogation program 700 stops (740).

Figure 8:
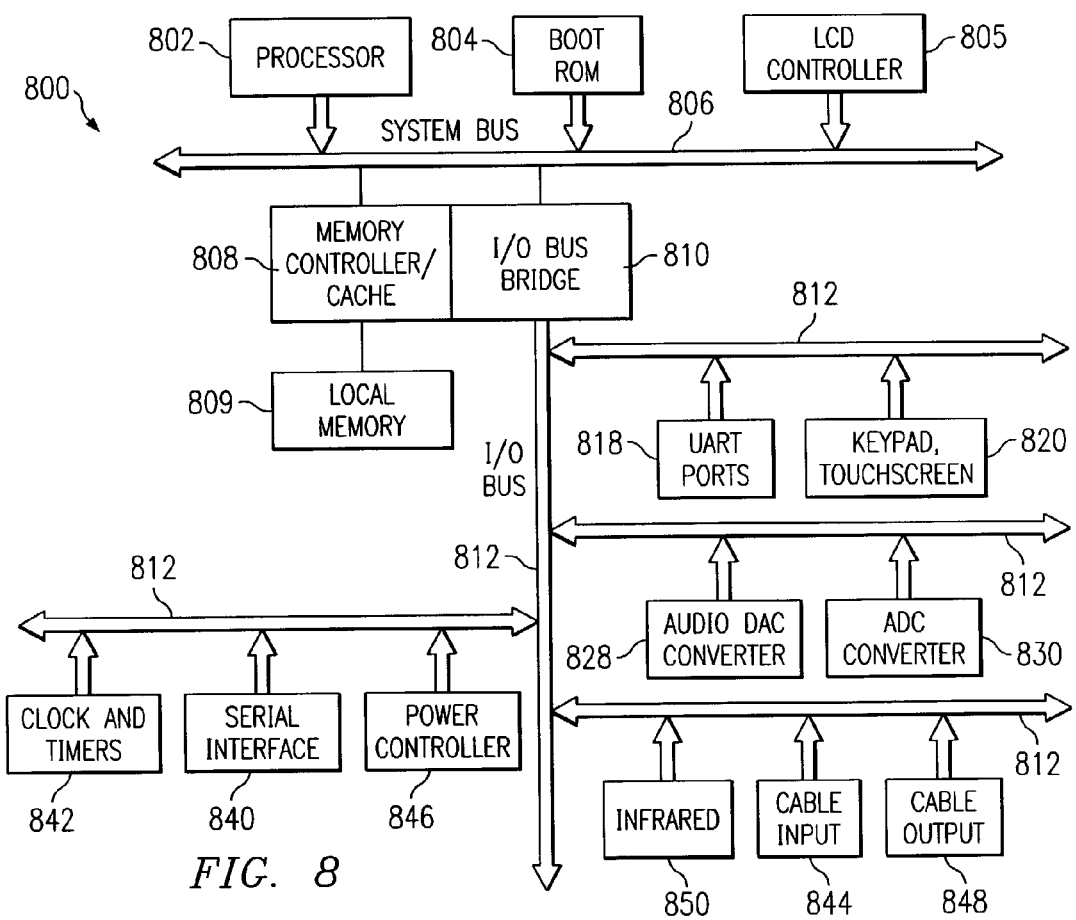
FIG. 8 is a depiction of the data processing system contained within the logical unit.

FIG. 8 is a depiction of the data processing system 800 contained within logical unit 106 (See FIG. 1). Data processing system 800 comprises processor 802, boot rom 804, and LCD controller 805 coupled to system bus 806. Also connected to system bus 806 is memory controller/cache 808, which provides an interface to local memory 809. I/O bus bridge 810 is connected to system bus 806 and provides an interface to I/O bus 812. Memory controller/cache 808 and I/O bus bridge 810 may be integrated as depicted.

Peripheral components are connected via I/O bus 812. Typical peripheral components include Universal Asynchronous Receiver Transmitter (UART) 818, a keypad or touch screen 820, digital-to-analog converters 828, analog-to-digital converters 830, serial interface controller 840, clocks and timers 842, cable output to the television 848, power controller 846, cable input from the cable provider 848 844, and infrared ports 850. Those skilled in the art will appreciate the depiction of data processing system 800 in FIG. 8 is exemplary and is not intended as an architectural limitation of the present invention. Data processing system 800 may be a separate single controller.

Many optional features can be displayed along with the alternative programming. For example, it may be beneficial to display a timer in the corner of the screen which shows the time remaining until the end of the blocked commercial. Additionally, the user may desire to have a brief description of which commercial is being blocked. Moreover, the user may wish to have a timer counting down the amount of time until the desired television content returns. Furthermore, the inventive concept contained herein can be utilized to block all commercials and display only desired programming. If the user desires to block all television commercials, then the logical unit develops a library of the unwanted commercials. The library of blocked commercials could be accessed by the user according to an Archive Interrogation Program (AIP) that would allow the library of blocked commercials to be searched by key words, phrases, date and time or other any other method that a person skilled in the art may use to search a library of stored data. Commercials designated as blocked by the user are added to the library and blocked in the future. Alternatively, the logical unit can buffer the entire multiplexed signal, delay the signal a pre-determined time (i.e. sixty seconds) and block out all television programming that is not greater than sixty seconds. This would block all thirty and sixty second television commercials. This implementation can also be orchestrated at the cable provider rather than the user's television or the logical unit. The user may have the option to block selected commercials permanently (without the recourse to unblock the commercial at a later time) while designating other commercials as non-permanently blocked commercials (with the recourse to unblock the commercial at a later time). The user may have the option to block all previously blocked commercials (and to view new commercials) or to block all commercials. In addition, the user may be provided with the option to block, unblock and access the programming of the logical unit by means of voice commands or audible signals such as clapping.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A method for displaying a television segment in place of a blocked television commercial based on interrogation of a television signal comprising:
   receiving a first television signal;
   recognizing said first television signal in a logical unit;
   wherein said first television signal is recognized by a cumulative digital signature;
   wherein the cumulative digital signature is the aggregation of at least one selected characteristic of a data sequence to provide a unique number for identification of the complete data sequence;
   blocking said first television signal by to logical unit;
   buffering a second television signal;
   specifying a search parameter;
   searching said second television signal for a data that matches said search parameter;
   responsive to finding the data that matches said search parameter, identifying a contingent television segment as a third television signal; and
   displaying the third television signal in plane of the first television signal.

2. The method of claim 1 further comprising:
   defining a length of the third television signal as T before;
   wherein T means a numerical value corresponding to a playing time of the data; and
   wherein T before means a length of the third television signal equal to the data and extending before the data for a time equal to T.

3. The method of claim 1 further comprising:
   defining a length of the third television signal as T after;
   wherein T means a numerical value corresponding to a playing time of the data; and
   wherein T after means a length of the third television signal equal to the data and extending after the data for a time equal to T.

4. The method of claim 1 further comprising:
   defining a length of the third television signal as T center;
   wherein T means a numerical value corresponding to a playing time of the data; and
   wherein T center means a length of the third television signal equal to the data and extending before the data for a time equal to ½ T and extending after the data for a time equal to ½ T.

5. The method of claim 1 wherein said search parameter is a keyword.

6. The method of claim 1 wherein said data is a closed captioning signal.

7. The method of claim 1 wherein said buffering occurs when a television unit is not activated.

8. The method of claim 1 further comprising decoding said television signal.

9. The method of claim 1 further comprising linking said search parameter by at least one logical relationship.

10. The method of claim 1 further comprising:
    comparing said search parameter to a dictionary to determine if the search parameter is an actual word in the dictionary; and
    responsive to the determination that the search parameter is not an actual word in the dictionary, giving a user an opportunity to change the search parameter.

11. The method of claim 10 further comprising:
    obtaining lexically parsed equivalents by lexical parsing the search parameter and searching said television signal for data that matches said lexically parsed equivalents; and
    wherein lexical parsing is a process of finding matches to a desired search term by comparing the desired search term letter-by-letter with the terms in an available database.

12. The method of claim 1 further comprising comparing said search parameter to a thesaurus.

13. The method of claim 12 further comprising obtaining synonym equivalents and searching said television signal for data that matches said synonym equivalents.

14. The method of claim 1 wherein said buffering simultaneously occurs over a plurality of television channels embedded within said television signal.

15. The method of claim 1 wherein said first television signal is a commercial.

16. The method of claim 1 further comprising:
wherein said first television signal is recognized by a component signature; and
wherein the component signature is a group of variables, based on a time component, an X video component, a Y video component, and an audio component, that are used to identify a commercial from all other commercials when a cumulative digital signature is not available.

17. The method of claim 1 further comprising:
wherein said first television signal is recognized by a unique digital identifying tag; and
wherein the unique digital identifying tag is a number sequence before a header and after a trailer of the first television signal.

18. The method of claim 1 wherein said search parameter is a user-defined parameter.

19. An apparatus for identifying an alternate viewing segment to replace a blocked television commercial comprising:
a logical unit with a memory;
a program stored in said memory;
said memory, so configured by said program, causes said logical unit perform operations comprising:
receiving a first television signal;
recognizing said first television signal in the logical unit;
wherein said first television signal is recognized by a unique digital identifying tag;
wherein the unique digital identifying tag is a number sequence before a header and after a trailer of the first television signal;
blocking said first television signal by the logical unit;
buffering a second television signal;
specifying a search parameter;
searching said second television signal for data that matches said search parameter;
responsive to finding a data that matches said search parameter, identifying a contingent television segment as a third television signal;
displaying the third television signal in place of the first television signal.

20. The apparatus of claim 19 further comprising:
defining a length of the third television signal as T before;
wherein T means a numerical value corresponding to a playing time of the data; and
wherein T before means a length of the third television signal equal to the data and extending before the data for a time equal to T.

21. The apparatus of claim 19 further comprising:
defining a length of the third television signal as T after;
wherein T means a numerical value corresponding to a playing time of the data; and
wherein T after means a length of the third television signal equal to the data and extending after the data for a time equal to T.

22. The apparatus of claim 19 further comprising:
defining a length of the third television signal as T center;
wherein T means a numerical value corresponding to a playing time of the data; and
wherein T center means a length of the third television signal equal to the data and extending before the data for a time equal to ½ T and extending after to data for a time equal to ½ T.

23. The apparatus of claim 19 wherein said search parameter is a user-defined parameter.

24. The apparatus of claim 23 wherein said search parameter is a keyword.

25. The apparatus of claim 24 wherein said data is a closed captioning signal.

26. The apparatus of claim 25 wherein said buffering occurs when a television unit is not activated.

27. The apparatus of claim 26 wherein said operations further comprise decoding said television signal.

28. The apparatus of claim 27 wherein said operations further comprise linking said search parameter by at least one logical relationship.

29. The apparatus of claim 28 wherein said operations further comprise:
comparing said search parameter to a dictionary to determine if the search parameter is an actual word in the dictionary; and
responsive to the determination that the search parameter is not an actual word in the dictionary, giving a user an opportunity to change the search parameter.

30. The apparatus of claim 29 wherein said operations further comprise:
obtaining lexically parsed equivalents by lexical parsing the search parameter and searching said television signal for data that matches said lexically parsed equivalents; and
wherein lexical parsing is a process of finding matches to a desired search term by comparing the desired search term letter-by-letter with the terms in an available database.

31. The apparatus of claim 30 wherein said operations further comprise comparing said search parameter to a thesaurus.

32. The apparatus of claim 31 wherein said operations further comprise obtaining synonym equivalents and searching said television signal for data tat matches said synonym equivalents.

33. The apparatus of claim 32 wherein said buffering simultaneously occurs over a plurality of television channels embedded within said television signal.

34. An apparatus for identifying an alternate viewing segment to replace a blocked television commercial comprising:
means for receiving a first television signal;
means for recognizing said first television signal in the logical unit;
wherein said first television signal is recognized by a component signature;
wherein the component signature is a group of variables, based on a time component, an X video component, a Y video component, and an audio component, that are used to identify a commercial from all other commercials when a cumulative digital signature is not available;
means for blocking said first television signal by the logical unit;
means for buffering a second television signal;
means for specifying a search parameter;
means for searching said second television signal for data that matches said search parameter;

means for responsive to finding a data that matches said search parameter, identifying a contingent television segment as a third television signal; and means for displaying the third television signal in place of the first television signal.

35. The apparatus of claim 34 further comprising:

means for defining a length of the third television signal as T before;

wherein T means a numerical value corresponding to a playing time of the data; and wherein T before means a length of the third television signal equal to the data and extending before the data for a time equal to T.

36. The apparatus of claim 34 further comprising:

means for defining a length of the third television signal as T after;

wherein T means a numerical value corresponding to a playing time of the data; and wherein T after means a length of the third television signal equal to the data and extending after the data for a time equal to T.

37. The apparatus of claim 34 further comprising:

defining a length of the third television signal as T center;

wherein T means a numerical value corresponding to a playing time of the data; and wherein T center means a length of the third television signal equal to the data and extending before the data for a time equal to ½ T and extending after the data for a time equal to ½ T.

* * * * *

UNITED STATES PATENT AND TRADEMARK OFFICE
CERTIFICATE OF CORRECTION

PATENT NO. : 6,983,481 B2
DATED : January 6, 2006
INVENTOR(S) : Fellenstein et al.

It is certified that error appears in the above-identified patent and that said Letters Patent is hereby corrected as shown below:

Column 11,
Line 7, "848" should be deleted.

Column 12,
Line 11, "plane" should be -- place --.

Column 14,
Line 3, "to" should be -- the --.
Line 42, "tat" should be -- that --.

Signed and Sealed this

Twenty-first Day of February, 2006

JON W. DUDAS
*Director of the United States Patent and Trademark Office*

UNITED STATES PATENT AND TRADEMARK OFFICE
CERTIFICATE OF CORRECTION

PATENT NO. : 6,983,481 B2  
DATED : January 3, 2006  
INVENTOR(S) : Fellenstein et al.

It is certified that error appears in the above-identified patent and that said Letters Patent is hereby corrected as shown below:

Column 11,  
Line 7, "848" should be deleted.

Column 12,  
Line 11, "plane" should be -- place --.

Column 14,  
Line 3, "to" should be -- the --.
Line 42, "tat" should be -- that --.

This certificate supersedes Certificate of Correction issued February 21, 2006.

Signed and Sealed this

Twenty-eighth Day of March, 2006

JON W. DUDAS  
*Director of the United States Patent and Trademark Office*